US009928170B2

(12) United States Patent
Koker et al.

(10) Patent No.: US 9,928,170 B2
(45) Date of Patent: *Mar. 27, 2018

(54) SCATTER/GATHER CAPABLE SYSTEM COHERENT CACHE

(71) Applicant: Intel Corporation, Santa Clara, CA (US)

(72) Inventors: Altug Koker, El Dorado Hills, CA (US); Thomas A. Piazza, Granite Bay, CA (US); Murali Sundaresan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,045

(22) Filed: Sep. 13, 2016

(65) Prior Publication Data

US 2017/0068619 A1    Mar. 9, 2017

Related U.S. Application Data

(63) Continuation of application No. 14/122,256, filed as application No. PCT/US2013/043501 on May 31, 2013, now Pat. No. 9,471,492.

(51) Int. Cl.
| | | |
|---|---|---|
| *G06F 12/08* | (2016.01) | |
| *G06F 12/0804* | (2016.01) | |
| *G06F 12/0831* | (2016.01) | |
| *G06F 12/0875* | (2016.01) | |
| *G06F 12/0808* | (2016.01) | |
| *G06F 12/0811* | (2016.01) | |
| *G06F 12/128* | (2016.01) | |
| *G06F 12/0817* | (2016.01) | |

(Continued)

(52) U.S. Cl.
CPC ...... *G06F 12/0804* (2013.01); *G06F 12/0808* (2013.01); *G06F 12/0811* (2013.01); *G06F 12/0831* (2013.01); *G06F 12/0875* (2013.01); *G06F 12/128* (2013.01); *G06F 12/0822* (2013.01); *G06F 12/0846* (2013.01); *G06F 12/0853* (2013.01); *G06F 2212/621* (2013.01)

(58) Field of Classification Search
CPC .............. G06F 12/084; G06F 12/0808; G06F 12/0811; G06F 12/0822
USPC .................................................. 711/118, 146
See application file for complete search history.

(56) References Cited

U.S. PATENT DOCUMENTS 5,175,859 A   12/1992  Miller et al.
5,668,968 A    9/1997  Wu
(Continued)

FOREIGN PATENT DOCUMENTS

NO    1996032671 A1   10/1996
RU       2171490 C2    7/2001

OTHER PUBLICATIONS

PCT International Search Report and Written Opinion issued in corresponding PCT/US2013/043501 dated Feb. 27, 2014, (10 pages).

(Continued)

*Primary Examiner* — Than Nguyen
(74) *Attorney, Agent, or Firm* — Trop Pruner & Hu, P.C.

(57) ABSTRACT

In accordance with some embodiments, a scatter/gather memory approach may be enabled that is exposed or backed by system memory and uses conventional tags and addresses. Thus, such a technique may be more amenable to conventional software developers and their conventional techniques.

23 Claims, 5 Drawing Sheets

(51) Int. Cl.
*G06F 12/0846* (2016.01)
*G06F 12/0853* (2016.01)

(56) References Cited

U.S. PATENT DOCUMENTS

| | | | |
|---|---|---|---|
| 5,745,732 A | 4/1998 | Cherukuri | |
| 5,924,121 A | 7/1999 | Arimilli et al. | |
| 7,328,304 B2 | 2/2008 | Royer | |
| 8,307,194 B1 | 11/2012 | Scott et al. | |
| 8,478,941 B2 | 7/2013 | Hughes | |
| 8,578,097 B2 | 11/2013 | Kim | |
| 2003/0088740 A1 | 5/2003 | Glenn et al. | |
| 2003/0126350 A1 | 7/2003 | Murdock et al. | |
| 2004/0054690 A1 | 3/2004 | Hillerbrand et al. | |
| 2004/0158683 A1 | 8/2004 | Thatipelli et al. | |
| 2005/0193164 A1* | 9/2005 | Royer, Jr. | B82Y 10/00 711/113 |
| 2005/0273576 A1 | 12/2005 | Wilson | |
| 2007/0156963 A1 | 7/2007 | Yen-Kuang et al. | |
| 2007/0162647 A1 | 7/2007 | Tousek | |
| 2007/0266206 A1* | 11/2007 | Kim | G06F 12/0817 711/118 |
| 2009/0177843 A1 | 7/2009 | Wallach | |
| 2011/0082980 A1 | 4/2011 | Gschwind | |
| 2011/0138122 A1 | 6/2011 | Hughes et al. | |
| 2011/0307663 A1* | 12/2011 | Kultursay | G06F 17/5045 711/125 |
| 2012/0042121 A1* | 2/2012 | Kim | G06F 12/0817 711/105 |
| 2012/0047329 A1 | 2/2012 | Goel | |
| 2012/0144089 A1* | 6/2012 | Hall | G06F 12/08 711/3 |
| 2013/0297878 A1 | 11/2013 | Hughes et al. | |
| 2014/0040542 A1 | 2/2014 | Kim et al. | |
| 2014/0181464 A1 | 6/2014 | Forsyth et al. | |
| 2014/0337580 A1 | 11/2014 | Hughes et al. | |
| 2014/0359220 A1 | 12/2014 | Koker et al. | |

OTHER PUBLICATIONS

Seiler et al.: "Larrabee: A Many-Core x86 Architecture fo r Visual Computing", IEEE Micro, IEEE Service Center, Los Alamitos, CA, US, vol. 29, No. 1, Jan. 30, 2009 (Jan. 30, 2009), pp. 10-21, XP011252675.

EP Search Report in corresponding EP application No. 13885498.9 dated Jan. 17, 2017.

Tom Forsyth: "SIMD Programming with Larrabee", GDC 2009, Mar. 27, 2009 (Mar. 27, 2009), XP055330984, San Francisco, C a lifo rn ia , USA.

Daniel Sorin et al.: "A Primer on Memory Consistency and Cache Coherence", Mar. 2, 2011 (Mar. 2, 2011), Morgan & Claypool Publishers, XP055331016.

RU Office Action in corresponding RU application No. 2015146933 dated Nov. 9, 2016.

EP office action in corresponding EP application No. 13885498.9 dated Dec. 21, 2017 (10 pages).

Niar, S., et al., "Comparing Multiported Cache Schemes," PDPTA, 2003—pdfs.semanticscholar.org (7 pages).

\* cited by examiner

SCATTER/GATHER CAPABLE SYSTEM COHERENT CACHE

BACKGROUND

This application is a continuation application of U.S. patent application Ser. No. 14/122,256 filed Nov. 26, 2013, which is a 371 application no. PCT/US2013/043501 filed May 31, 2013, hereby expressly incorporated by reference herein.

BACKGROUND

This relates generally to using scatter/gather memory accesses.

In a scatter/gather memory access, the operating system delivers multiple discrete chunks of data in one operation from a file to separate, non-contiguous buffers in memory. Conversely, the scatter/gather memory access also writes data from non-contiguous buffers in one operation. In conventional scatter/gather memory access techniques, non-sequential accesses to memory are used via what is called a private memory. The private memory is not backed by system memory. Backing means there is no directory copy to memory. Accesses in private memory are coherent to a portion of the hardware but not visible to entire graphics processing unit (GPU) or system. No tags or addresses are used, in contrast to conventional cache accesses. The private memory is indexed and uses location based addressing.

One problem with private memory is that explicit software and application program interface level interfaces are needed to expose private memory to developers. Thus, private memory is generally only a viable solution in specialized applications like gaming or special purpose compute workloads. Since private memory does not use system memory, and this is the only memory used by most developers, it is impractical in most cases.

A private memory is exposed to a developer who copies from system memory into private memory. Then the operations, such as the applications, are run and the results from those operations are copied back into system memory to make the results visible to the rest of the system. Conventionally, the private memory is embedded in a chip such as a graphics processing unit and is only addressed through an application program interface.

BRIEF DESCRIPTION OF THE DRAWINGS

Some embodiments are described with respect to the following figures.

DETAILED DESCRIPTION

Figure 1:
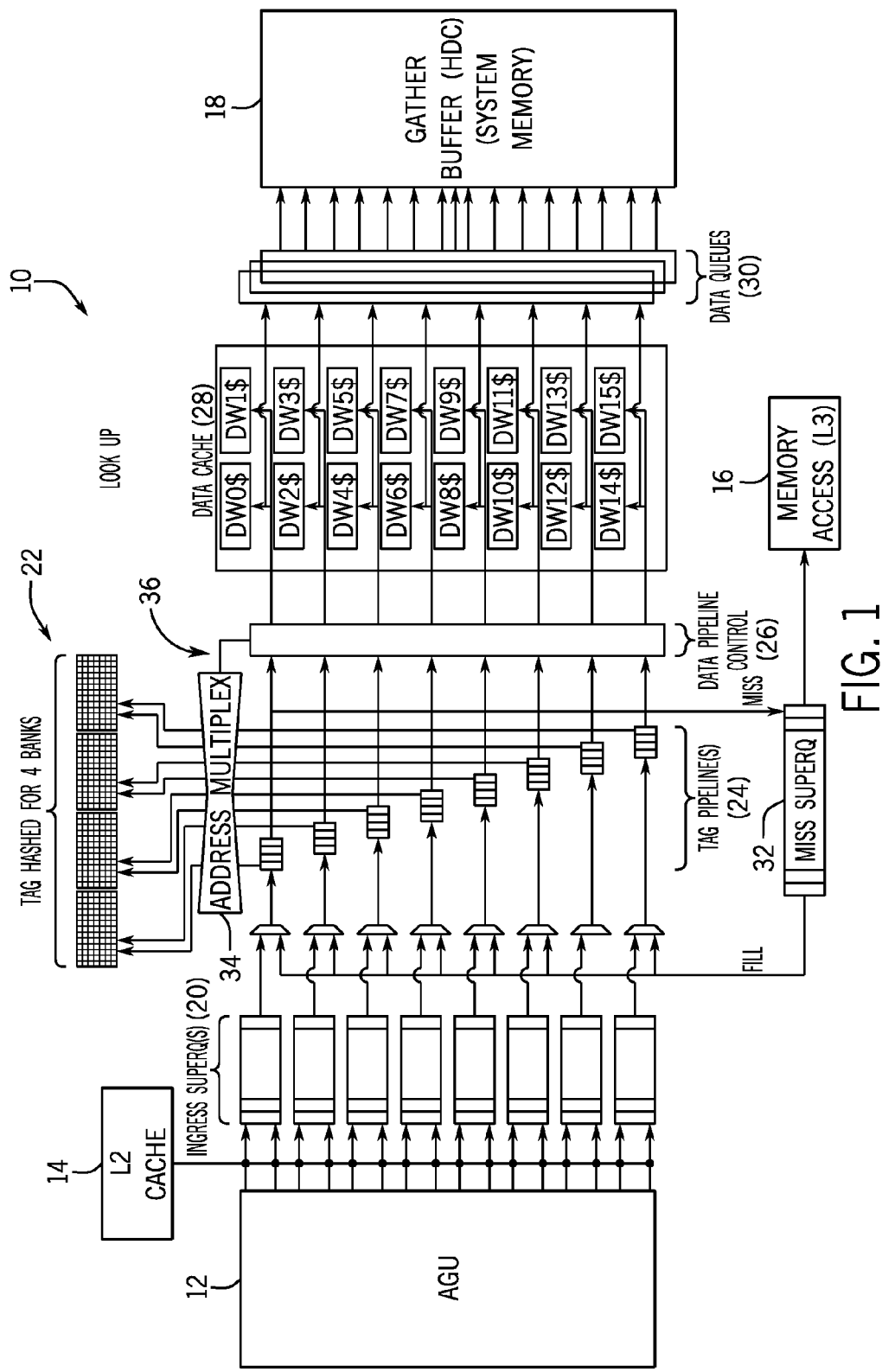
FIG. 1 is a hardware depiction for one embodiment.

In accordance with some embodiments, a scatter/gather memory approach may be enabled that is exposed or backed by system memory and uses conventional tags and addresses. Thus, such a technique may be more amenable to conventional software developers and their conventional techniques.

One reason for having a system memory backed scatter/gather memory access is the coming implementation of a stored execution model that can write any C++ code application. Such an application can be submitted on the system and the system distributes the work between both the central processing unit and the graphics processing unit. Memory accesses are generally under the scatter/gather protocols. The problem then is that private memories are not sufficiently applicable to implement a stored execution model. So a new approach to scatter/gather memories is needed wherein the scatter/gather capable structure acts like a cache and can be backed up on system memory and is structured so that it can be hidden in hardware in some embodiments.

According to one embodiment, a scatter/gather oriented cache may be situated between compute elements including the address generation unit and memory having the capability to improve the throughput needed not only for sequential accesses but also random or strided access patterns. A scatter/gather cache can interface towards the address generation unit that is already placed in the message path of compute elements. The scatter/gather cache may be capable of servicing multiple addresses per clock. Multiple addresses of different cache lines with lane enables may be generated from the address generation unit. Lane enables are extensions of address bits where cache lines are broken down into smaller granularities. For example in the case of double word lanes up to 16 addresses can be generated with double word enables for a 64 byte cache line. If multiple addresses are on the same double word lanes, such cases can be serialized or fragmented by the address generation unit itself. Such serialization may be useful if the scatter/gather cache has a limitation of no more than one access per lane per clock. A scatter/gather cache tag can be organized as multiple banks, each with multiple read ports operating at a higher compute baseline clock speed. A tag is a unique identifier for a group of data. Because different regions of memory may be mapped into a block, a tag is used to differentiate between them. To simplify hardware costs, tag banking can be increased where multiple addresses are hashed between the tag banks to limit the need for extra read ports for higher read access times.

In the case of a load to memory, tag processed addresses may be split based on the hit and miss criteria. The hits may be pushed to the data pipeline where each double word is extracted and placed into a return data path. Cache misses are pushed towards a tracking queue to be sent to a memory fabric for fulfillment. For memory stores, hits are sent to the data pipeline for proper merging and cache misses are pushed to the memory fabric to get their read for ownership. This step may be used to maintain a system coherent cache.

System coherency (i.e. making GPU accesses visible to rest of the computes) requires certain flows for lower level caches to send a notification to higher level coherent caches for notification purposes. This enables higher level caches/structures to track the contents of low level caches and direct further matching accesses to lower caches via snooping them to guarantee data consistency.

Thus the scatter/gather cache may use lane enables like private memory. However, multiple addresses of different cache lines with lane enables are generated by the address generation unit. So a standard cache address generation unit may be used in some embodiments that generate a single address with tags and backs onto system memory.

Thus in some embodiments, the scatter/gather address generation unit uses tags with system back-up unlike private memory. In addition, the scatter/gather based cache achieves system data consistency via hardware coherency. The use of hardware coherency removes the software requirement of synchronizing data structures which is a big burden in case of application program interfaces (APIs) with private scatter/gather memory. This would not only eliminate the need for software to move data around the system and also remove the requirement of excessive flushing of low level caches to synchronize closely shared data structures.

Referring to FIG. 1, the address generation unit (AGU) 12 feeds a plurality of ingress super queues 20. In one embodiment one super queue is accessed 1-2 (or many) times per clock. In one embodiment, the address generation unit issues 16 addresses per clock. The address generation unit is capable of producing N-addresses, in parallel (e.g. 16, 32, 64 . . . ) where N may be scalable per structure. These addresses may be multiplexed with the output from a higher level cache such as the level 2 (L2) cache 14. The ingress super queues connect to tag pipelines 24 which in turn connect to the tag hash for four banks 22, in this example. The concept of a bank is also design and cost optimization dependent. It is technically possible for a bank to support multiple accesses per cycle.

The access to the banks is through an address multiplex 34 which communicates by the line 36 with the data pipeline control 26. The data pipeline control is coupled to the data cache 28 and the data queues 30. The output from the data queues 30 is provided to a gather buffer in system memory 18.

Each fill request is issued by a miss super queue 32 which also receives misses from the various tag pipelines. The miss super queue is coupled to the memory access 16 which in one embodiment may be the next level cache (e.g. level 2, 3, 4 . . . ) level 3 or L3 cache.

The scatter/gather cache 10 shown in FIG. 1 may provide 16 or more double words per clock, each double word being returned on its lane that it was requested on, with the corresponding tags or identifiers for the address generation unit to reassemble the contents of the compute element's message by its gather buffers. The miss queue 32 is a shared resource to process tag misses and schedules fills as data is processed by the memory fabric. The system coherency rules are handled through the same structure.

Figure 5:
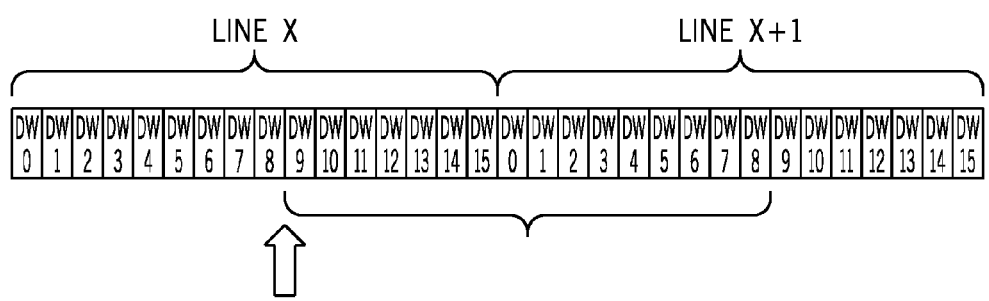
FIG. 5 shows a depiction of an address look-up according to one embodiment.

A tag can be hashed into multiple banks 22, where each bank is operated with higher baseline clock speed and/or multiple read ports, providing multiple concurrent look-ups per compute clock. Each tag request may be set with a link signifying that adjacent data lanes are going to be processed with its address as the base. Some address look-ups within a cache line would not result in multiple look-ups on the same line. Thus as a simple example, if we take a scatter double word case as shown in FIG. 5, the message starts with a double word number 9 of line x and requires 16 double words. The address generation unit sends the address of line x on a lane of DW #9 with a length of 7 and an address of line x+1 of DW #0 with a length of 9. Tag processing does two look-ups and pushes the data pipeline with the required number of double words requested.

The addresses from the generation unit need to get into the tag structure to do compares to see if the data is in the cache. One could use 16 read ports into the tag structure but this is too expensive. The tag structure can be divided into four banks in one embodiment, each with a unique address and hash address. If matching addresses are in the tag bank, the address is forwarded to the corresponding tag block. If all 16 addresses go to the same block or bank, then extra clocks are allocated automatically to process hits and misses in one embodiment. A cache contains a fill cache line for each tag. A miss may be stored and then may be filled back into tags. The system makes sure all 16 lanes have valid data. Other alternatives include 8 banks with a single port or 2 banks with 4 ports.

For the tags that generate hits, the data on the corresponding lanes are returned immediately. In the case of a cache miss, the required double words are returned as they become available from the cache or memory fabric. Cache fills the missed lines as full cache lines with a tag that corresponds to the miss.

System coherency may be achieved as follows. The address generation unit pads may be intercepted by snooping the addresses on those tags. The external central processing unit sends a snoop cycle into the same tag structure via the next higher level cache 14. The tag structure takes the snooping address and compares it to tag structures. This exposes the data to the rest of the system as required. The output of the address generation unit gets multiplexed with the external address from the higher level cache which multiplexes into the address generation unit addresses.

Figure 2:
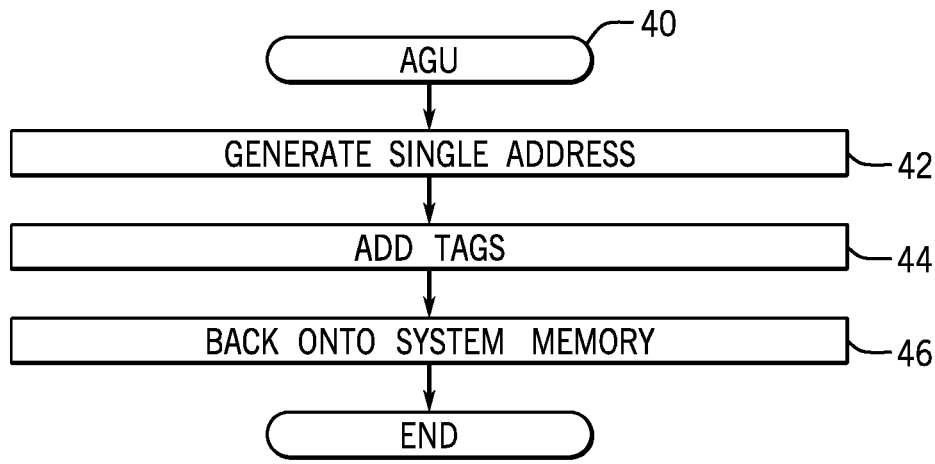
FIG. 2 is a flow chart for an address generation unit according to one embodiment.

Thus referring to FIG. 2, the address generation unit performs a sequence 40 in some embodiments. It may be implemented in software, firmware and/or hardware. In software and firmware embodiments it may be implemented by instructions stored in one or more non-transitory computer readable media for execution by a processing unit. Examples of such media include semiconductor, magnetic or optical storage.

The sequence 40 begins by generating a single address as indicated in block 42. Then the tags are added as indicated block 44. Finally the contents are backed onto system memory as indicated in block 46.

Figure 3:
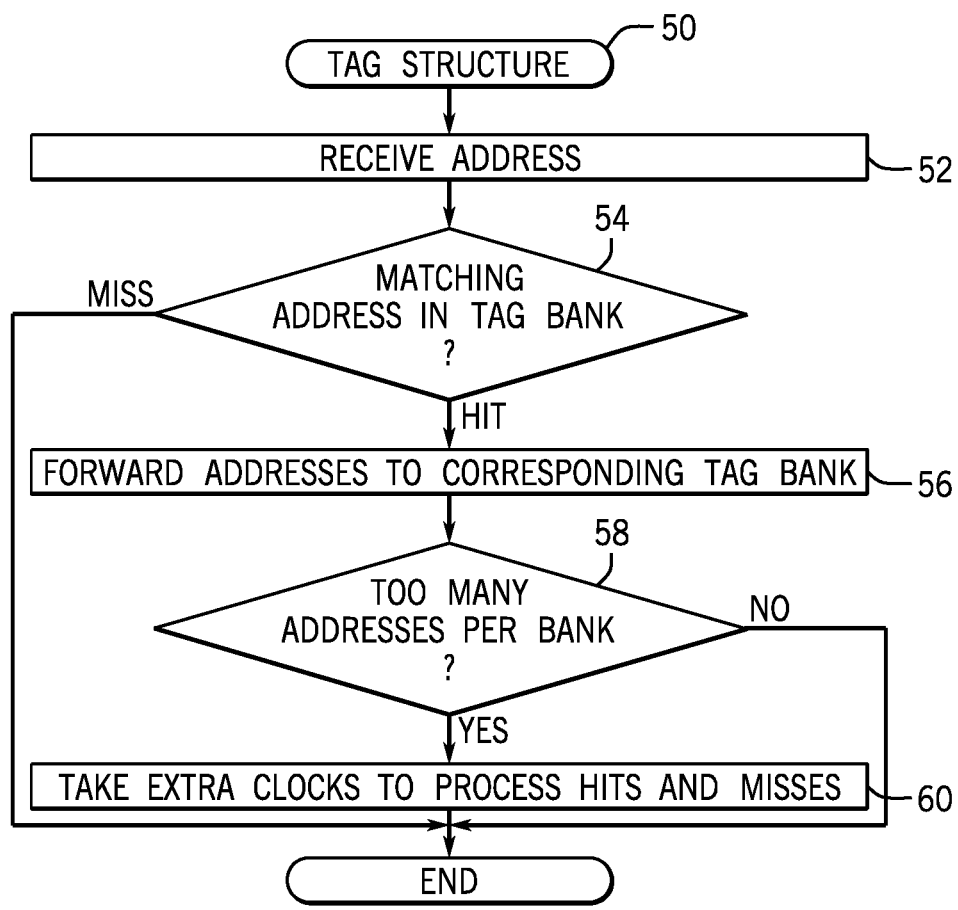
FIG. 3 is a flow chart for a tag structure according to one embodiment.

The operation of the tag structure, shown in FIG. 3, may be implemented in software, firmware or hardware. In software or firmware embodiments it may be implemented by computer executed instructions stored in one or more non-transitory computer readable media. Examples of computer readable media include optical, magnetic or semiconductor storage.

The sequence 50 begins by receiving an address as indicated in block 52. A check at diamond 54 determines whether there is a matching address in the tag bank. If there is a miss, the flow ends. Conversely if there is a hit, the addresses are forwarded to the corresponding tag bank as indicated in block 56. A check at diamond 58 determines whether there are too many addresses per bank. If not, the flow ends and otherwise, extra clocks may be taken to process hits and misses (block 60).

Figure 4:
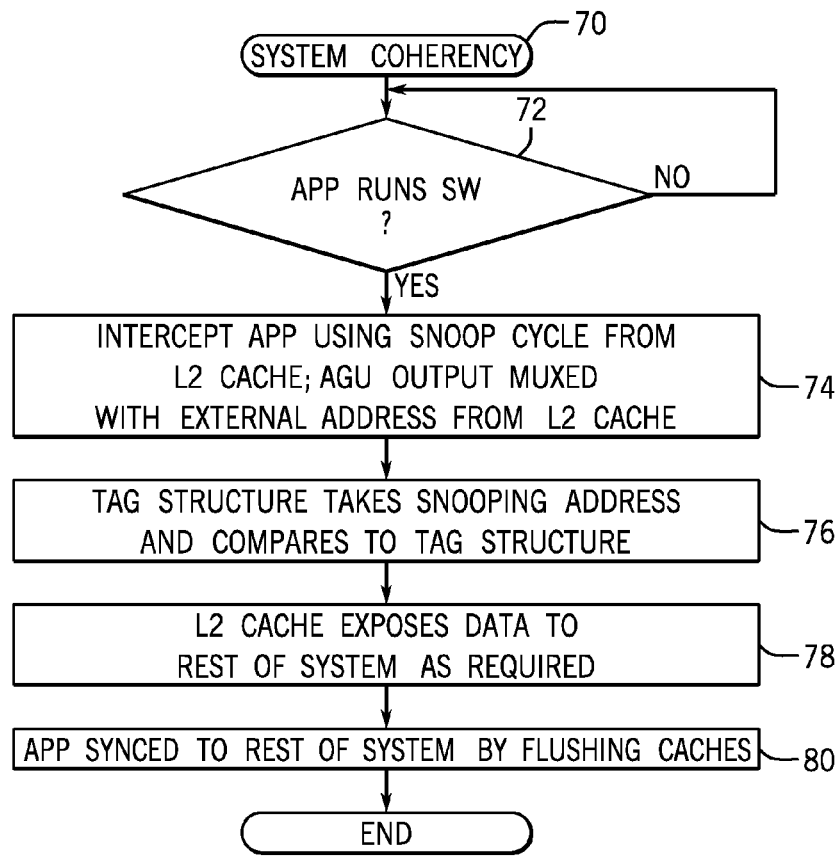
FIG. 4 is a flow chart for system coherence according to one embodiment.

The sequence 70, to implement system coherency may be implemented in software, hardware or firmware as shown in FIG. 4. In software and firmware embodiments it may be implemented by one or more non-transitory computer readable media storing instructions executed by a computer. Examples of such media include optical, semiconductor and magnetic storages.

The sequence 70 begins by determining whether an application is running software at diamond 72. If so, the application is intercepted using a snoop cycle from the higher level caches. The address generation unit output is multiplexed with the external address from the L2 cache as indicated in block 74.

The tag structure takes the snooping address and compares it to the tag structure as indicated in block 76. The L2 cache exposes data (block 78) to the rest of the system by flushing caches (block 80).

Figure 6:
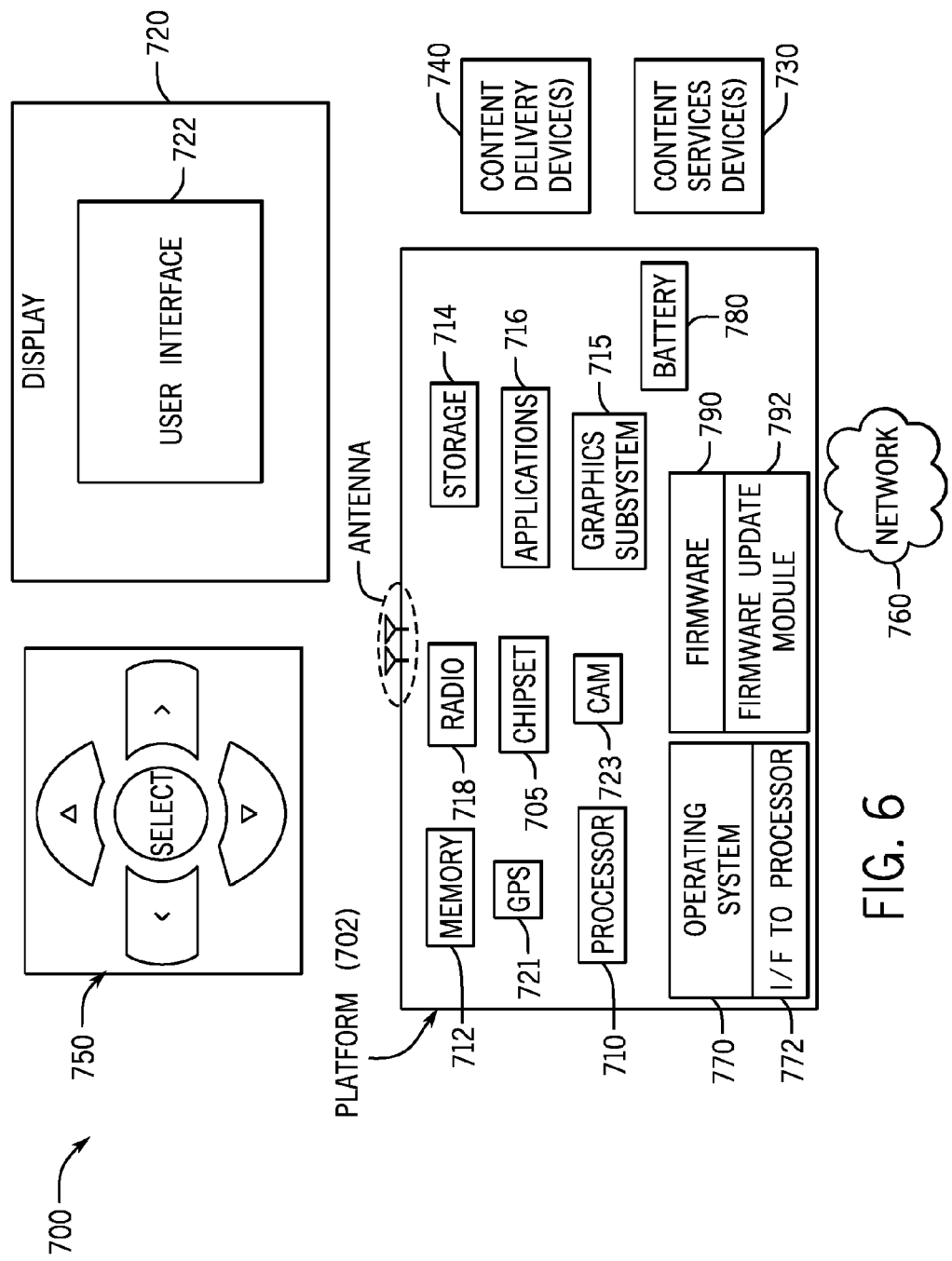
FIG. 6 is a system depiction for one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 2-4 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the scope of this disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the scope of this disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
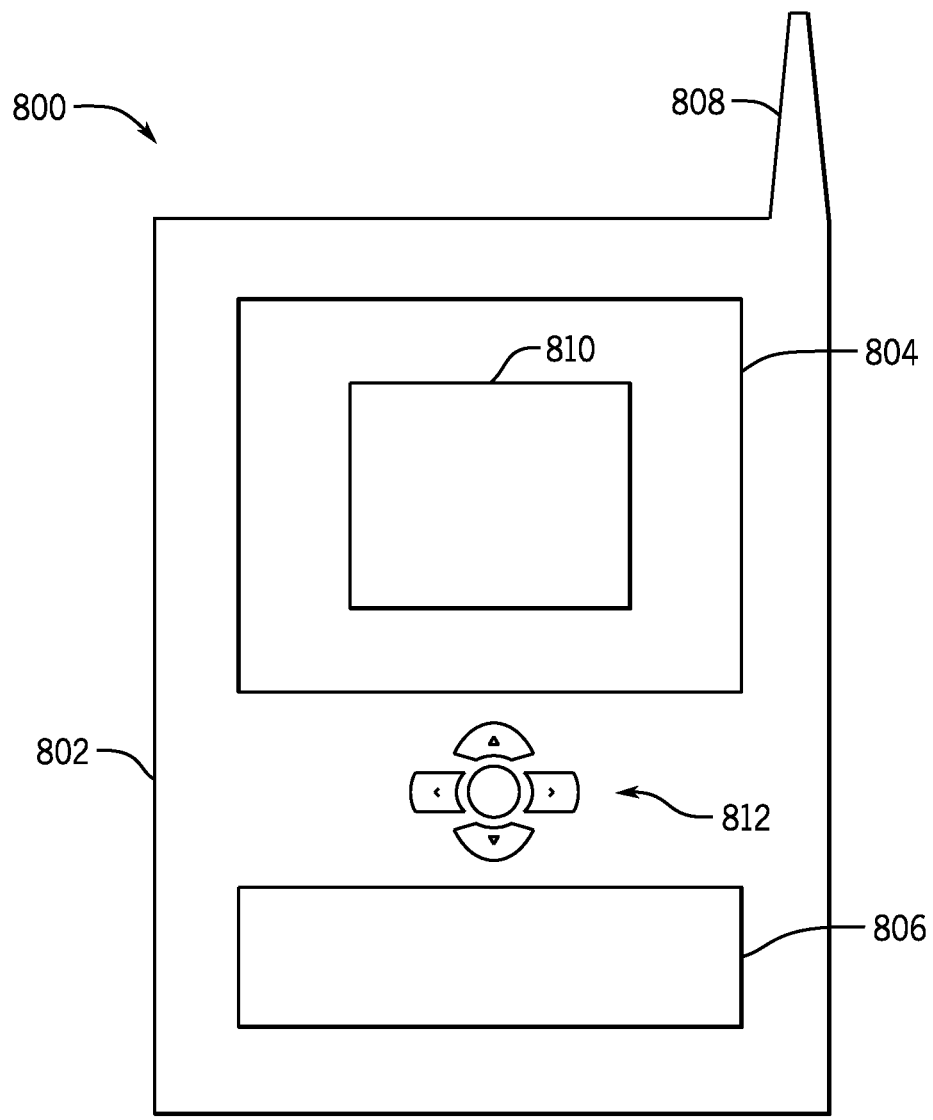
FIG. 7 is a front elevational view for one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 2-4 in software and/or firmware embodiments.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising using a cache to implement scatter/gather memory access and backing said cache on system memory. The method may also include enabling said cache to use tags. The method may also include using said cache to implement a stored execution model. The method may also include locating said cache between an address generation unit and memory. The method may also include generating lane enables from the address generation unit. The method may also include organizing a cache as multiple banks. The method may also include using tag banking and hashing multiple addresses between banks. The method may also include using software to provide system coherency by intercepting each application and synchronizing with the rest of the system by flushing caches. The method may also include sending a snoop cycle into a tag structure, and comparing the snooping address to tag structures to expose data to the rest of system. The method may also include multiplexing the output of the address generation unit with an external address from a level 2 cache.

In another example embodiment may be one or more non-transitory computer readable media storing instructions executed by a computer to perform a sequence comprising using a cache to implement scatter/gather memory access, and backing said cache on system memory. The media may further store said sequence including enabling said cache to use tags. The media may further store said sequence including using said cache to implement a stored execution model. The media may further store said sequence including locating said cache between an address generation unit and memory. The media may further store said sequence including generating lane enables from the address generation unit. The media may further store said sequence including organizing a cache as multiple banks. The media may further store said sequence including using tag banking and hashing multiple addresses between banks. The media may further store said sequence including using software to provide system coherency by intercepting each application and synchronizing with the rest of the system by flushing caches. The media may further store said sequence including sending a snoop cycle into a tag structure, and comparing the snooping address to tag structures to expose data to the rest of system. The media may further store said sequence including multiplexing the output of the address generation unit with an external address from a level 2 cache.

Another example embodiment may be an apparatus comprising a a system memory, a cache to implement scatter/gather memory access backed on system memory, and an address generation unit coupled to said cache. The apparatus may also include said cache to use tags. The apparatus may also include said cache to implement a stored execution model. The apparatus may also include said cache between the address generation unit and system memory. The apparatus may also include the address generation unit to generate lane enables. The apparatus may also include wherein the cache is organized as multiple banks. The apparatus may also include said cache to use tag banking and hashing multiple addresses between banks. The apparatus may also include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   using a cache to implement scatter/gather memory access;
   backing said cache on system memory;
   assigning different multiple addresses within a cache line per clock;
   sending a snoop cycle into a tag structure to determine whether a snooping address is in the tag structure, and comparing the snooping address to a tag in said structure to determine whether the snooping address is stored in said tag structure and using said snooping address to access data; and
   if multiple cache line lookups address the same cache line in the same clock, serializing the multiple lookups.

2. The method of claim 1 including enabling said cache to use tags.

3. The method of claim 1 including locating said cache between an address generation unit and memory.

4. The method of claim 3 including generating lane enables from the address generation unit.

5. The method of claim 1 including organizing a cache as multiple banks.

6. The method of claim 5 including using tag banking and hashing multiple addresses between banks.

7. The method of claim 1 including multiplexing an output of an address generation unit with an external address from a level 2 cache.

8. One or more non-transitory computer readable media storing instructions executed by a computer to perform a sequence comprising:
- using a cache to implement scatter/gather memory access;
- backing said cache on system memory;
- assigning different multiple addresses within a cache line per clock;
- sending a snoop cycle into a tag structure to determine whether a snooping address is in the tag structure, and comparing the snooping address to a tag in said structure to determine whether the snooping address is stored in said tag structure and using said snooping address to access data; and
- if multiple cache line lookups address the same cache line in the same clock, serializing the multiple lookups.

9. The media of claim 8, said sequence including enabling said cache to use tags.

10. The media of claim 8, said sequence including locating said cache between an address generation unit and memory.

11. The media of claim 10, said sequence including generating lane enables from the address generation unit.

12. The media of claim 8, said sequence including organizing a cache as multiple banks.

13. The media of claim 12, said sequence including using tag banking and hashing multiple addresses between banks.

14. The media of claim 8, said sequence including multiplexing an output of an address generation unit with an external address from a level 2 cache.

15. An apparatus comprising:
- a system memory;
- a cache to implement scatter/gather memory access backed on system memory, assign different multiple addressed within a cache line per clock, send a snoop cycle into a tag structure to determine whether a snooping address is in the tag structure, and comparing the snooping address to a tag in said structure to determine whether the snooping address is stored in said tag structure and using said snooping address to access data, if multiple cache line lookups address the same cache line in the same clock, serializing the multiple lookups; and
- an address generation unit coupled to said cache.

16. The apparatus of claim 15 said cache to use tags.

17. The apparatus of claim 15 said cache between the address generation unit and system memory.

18. The apparatus of claim 17 from the address generation unit to generate lane enables.

19. The apparatus of claim 15 wherein the cache is organized as multiple banks.

20. The apparatus of claim 19 including said cache to use tag banking and hashing multiple addresses between banks.

21. The apparatus of claim 15 including an operating system.

22. The apparatus of claim 15 including a battery.

23. The apparatus of claim 15 including firmware and a module to update said firmware.

* * * * *